US008625610B2

(12) United States Patent
Asati et al.

(10) Patent No.: US 8,625,610 B2
(45) Date of Patent: *Jan. 7, 2014

(54) SYSTEM AND METHOD FOR IMPROVING SPOKE TO SPOKE COMMUNICATION IN A COMPUTER NETWORK (75) Inventors: Rajiv Asati, Morrisville, NC (US); Mohamed Khalid, Cary, NC (US); Brian E. Weis, San Jose, CA (US); Pratima Pramod Sethi, Maharashtra (IN)

(73) Assignee: Cisco Technology, Inc., San Jose, CA (US)

(*) Notice: Subject to any disclaimer, the term of this patent is extended or adjusted under 35 U.S.C. 154(b) by 1259 days.

This patent is subject to a terminal disclaimer.

(21) Appl. No.: 11/871,508

(22) Filed: Oct. 12, 2007

(65) Prior Publication Data

US 2009/0097417 A1    Apr. 16, 2009

(51) Int. Cl.
H04L 12/28    (2006.01)

(52) U.S. Cl.
USPC ............ 370/401; 370/389; 370/255; 713/153

(58) Field of Classification Search
USPC .......... 709/223, 224, 238–243; 713/150–153, 713/162, 163; 370/389, 255, 401, 395.31
See application file for complete search history.

(56) References Cited

U.S. PATENT DOCUMENTS

| 5,627,892 | A | 5/1997 | Kauffmann |
| 7,046,662 | B1 * | 5/2006 | Saluja et al. ................ 370/389 |
| 7,184,437 | B1 | 2/2007 | Cole et al. |
| 7,234,063 | B1 | 6/2007 | Baugher et al. |
| 7,298,839 | B2 | 11/2007 | Eisentraeger et al. |
| 7,308,706 | B2 | 12/2007 | Markham et al. |
| 7,366,894 | B1 * | 4/2008 | Kalimuthu et al. ........... 713/153 |
| 7,447,901 | B1 | 11/2008 | Sullenberger et al. |
| 7,486,795 | B2 | 2/2009 | Eschenauer et al. |
| 7,536,715 | B2 | 5/2009 | Markham |
| 7,558,877 | B1 * | 7/2009 | Fedyk et al. .................. 709/242 |
| 7,594,262 | B2 | 9/2009 | Hanzlik et al. |
| 7,596,690 | B2 | 9/2009 | Singh |
| 7,602,737 | B2 | 10/2009 | Asati et al. |
| 7,657,036 | B2 | 2/2010 | Hsu et al. |
| 7,720,995 | B2 | 5/2010 | Wainner et al. |
| 7,801,030 | B1 | 9/2010 | Aggarwal et al. |
| 7,840,810 | B2 | 11/2010 | Eastham |
| 7,848,335 | B1 | 12/2010 | Kang et al. |
| 7,957,320 | B2 | 6/2011 | Konig et al. |
| 7,962,743 | B2 * | 6/2011 | Fluhrer ........................ 713/153 |

(Continued)

OTHER PUBLICATIONS

Rekhter, Y., et al., *A Border Gateway Protocol 4 (BGP-4)*, RFC 4271, [retrieved Mar. 2010], IETF, <http://tools.ietf.org/html/rfc4271>, (Jan. 2006), 105 pgs.

(Continued)

*Primary Examiner* — Dang Ton
*Assistant Examiner* — Mandish Randhawa
(74) *Attorney, Agent, or Firm* — Schwegman Lundberg & Woessner, P.A.

(57) ABSTRACT

Various embodiments of the disclosed subject matter provide methods and systems for improved efficiency in spoke-to-spoke network communication. Embodiments provide systems and methods for registering a spoke with a hub, updating at least one database with spoke registration information at the hub, and advertising the spoke registration information to other spokes using a single control plane that includes transport security, peer discovery, and unicast routing information.

24 Claims, 5 Drawing Sheets (56) References Cited

U.S. PATENT DOCUMENTS

| | | | |
|---|---|---|---|
| 2003/0126265 A1* | 7/2003 | Aziz et al. | 709/227 |
| 2003/0191937 A1 | 10/2003 | Balissat et al. | |
| 2003/0211842 A1 | 11/2003 | Kempf et al. | |
| 2004/0103283 A1 | 5/2004 | Hornak | |
| 2005/0114663 A1 | 5/2005 | Cornell et al. | |
| 2006/0253556 A1 | 11/2006 | Wallis et al. | |
| 2006/0253703 A1 | 11/2006 | Eronen et al. | |
| 2007/0016663 A1* | 1/2007 | Weis | 709/223 |
| 2007/0248225 A1 | 10/2007 | Fluhrer | |
| 2007/0271451 A1* | 11/2007 | Fluhrer | 713/150 |
| 2008/0320303 A1* | 12/2008 | Khalid et al. | 713/163 |
| 2009/0157901 A1 | 6/2009 | Asati et al. | |
| 2009/0304004 A1 | 12/2009 | Huynh et al. | |
| 2010/0223458 A1 | 9/2010 | Mcgrew et al. | |
| 2011/0013641 A1 | 1/2011 | Kolhi et al. | |

OTHER PUBLICATIONS

*Dynamic Multipoint VPN (DMVPN) Design Guide*, [online]. Cisco Systems, Inc., San Jose, CA, [retrieved on Sep. 7, 2009]. Retrieved from the internet: <URL: http://www.archive.org/web/*/www.cisco.com/>>, (2006), 101 pgs.

Luciani, J., et al., "NBMA Next Hop Resolution Protocol (NHRP)", *Network Working Group, Request for Comments*: 2332, (Apr. 1998), 53 pgs.

*Configuring Dynamic Multipoint VPN Spoke Router in Full Mesh IPsec VPN Using Security Device Manager*, White Paper, Cisco Systems, Inc., (2004), 26 pgs.

Frey, G., et al., "The Tate Pairing and the Discrete Logarithm Applied to Elliptic Curve Cryptosystems", [online]. Oct. 7, 1998. [retrieved on Sep. 29, 2010]. Retrieved from the Internet: <URL: www-rcf.usc.edu/~mdhuang/cs599/frey98tate.pdf>, 5 pgs.

Menezes, A., et al., "Diffie-Hellman Key Exchange", In: *Handbook of Applied Cryptography*, CRC Press LLC, (1997), 4 pgs.

"U.S. Appl. No. 11/379,920, Response filed Sep. 29, 2010 to Non Final Office Action mailed Apr. 29, 2010", 14 pgs.

"U.S. Appl. No. 11/419,583, Notice of Allowance mailed Feb. 8, 2011", 7 pgs.

"U.S. Appl. No. 11/954,831, Response filed Aug. 16, 2010 to Final Office Action mailed Mar. 25, 2010", 7 pgs.

* cited by examiner

Figure 1

Hub Registration Table — 107

| Index | Spoke IP Address | Spoke Next Hop Mapping Information | Spoke Local Prefix Reachability Information | Spoke Public Keying Value (Optional) |
|---|---|---|---|---|
| 1 | 10.1.0.1 | 70.1.1.1 | 10.1.1.0/24 | 0xab1205... |
| 2 | 10.2.0.1 | 12.1.1.1 | 10.2.2.0/24 | 0x97aa0f... |
| 3 | 10.3.0.1 | 98.1.1.1 | 10.3.3.0/24 | 0xe79a14... |
| 4 | 10.4.0.1 | 40.1.1.1 | 10.4.4.0/24 | 0x94867a... |

SYSTEM AND METHOD FOR IMPROVING SPOKE TO SPOKE COMMUNICATION IN A COMPUTER NETWORK

CROSS-RELATED APPLICATIONS

This application is related to U.S. patent application Ser. No. 11/954,831, entitled "SYSTEM AND METHOD FOR USING ROUTING PROTOCOL EXTENSIONS FOR IMPROVING SPOKE TO SPOKE COMMUNICATION IN A COMPUTER NETWORK", filed on Dec. 12, 2007, and assigned to Cisco Technology, Inc.

TECHNICAL FIELD

The disclosed subject matter relates to the field of computer network communications, and more particularly to methods and systems for improving spoke to spoke communication in a computer network.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2007 Cisco Systems, Inc. All Rights Reserved.

BACKGROUND

A Virtual Private Network (VPN) is a logical network that uses non-secure public telecommunications, such as the Internet, to provide secure communications to members of the VPN. A VPN seeks to provide the security associated with dedicated communication lines without requiring the requisite hardware and at a fraction of the cost typically associated with dedicated communication lines.

A VPN works by using shared public infrastructure while simultaneously maintaining privacy through agreed upon security procedures and protocols. Essentially, a VPN uses custom encryption to encrypt messages communicated via the VPN. The encryption and decryption of messages rely upon keys that are securely held by participants of the VPN.

Dynamic Multipoint VPN (DMVPN) is an enhancement of the virtual private network configuration process of conventional network routers. DMVPN prevents the need for pre-configured (static) IPsec (IP security) peers in the network. IPsec is a standard for securing Internet Protocol (IP) communications by encrypting and/or authenticating all IP packets communicated among the network peers. IPsec provides security at the network layer. The DMVPN functionality of conventional network routers allows greater scalability over previous IPsec configurations. An IPsec tunnel between two conventional network routers may be created on an as-needed basis. Tunnels may be created between a spoke router and a hub router (VPN headend) or between spokes. This greatly alleviates the need for the hub to route data between spoke networks, as was common in a non-fully meshed frame relay topology.

In DMVPN, network traffic can traverse from one spoke to another. Initially, the network traffic is routed from a first spoke (e.g., spoke A) to the hub and then from the hub to a second spoke (e.g., spoke B). At the same time, DMVPN establishes a tunnel from spoke A to spoke B. Once the tunnel from spoke A to spoke B is created, traffic will be routed via the tunnel. Unfortunately, conventional DMVPN causes a significant reduction in the tunnel latency several seconds after the tunnel has been established. This sudden reduction in tunnel latency can cause problems in servicing delay-sensitive network traffic.

Thus, a system and method for improved efficiency in spoke-to-spoke network communication is needed.

DETAILED DESCRIPTION

In the following detailed description, reference is made to the accompanying drawings that form a part hereof, and in which are shown by way of illustration specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from the use of these terms in the context of the description.

As described further below, according to various example embodiments of the disclosed subject matter described herein, there is provided a system and method for improved efficiency in spoke-to-spoke network communication.

A DMVPN spoke is typically configured with enough information, such as one or more IP addresses, to communicate with a hub. DMVPN hub IP addresses are typically static. DMVPN spoke IP addresses may be static or dynamic. An example would be a DMVPN spoke router acting as a DHCP (Dynamic Host Configuration Protocol) client on a DSL (digital subscriber loop) or cable provider's network. The spoke router is configured with the hub's IP address, allowing the spoke to connect with the hub when online. The hub router does not need to be configured with the IP addresses of the spoke routers. This allows many spoke VPN routers to be deployed without the need to configure additional peers on the hub(s). In the past, the configuration of the hub grew whenever a spoke VPN router was added to the IPsec network.

To avoid routing through the hub router for spoke-to-spoke traffic, NHRP (next hop resolution protocol) is often also used for spoke discovery. A key use of NHRP is for next hop resolution. A DMVPN spoke router may learn of the static or dynamic IP address of other spoke routers, using at least one routing protocol adjacency, and may resolve the corresponding next hops using NHRP. Additional IPsec tunnels are created as needed for spoke-to-spoke traffic. To conserve resources, these tunnels are torn down after they are no longer needed. Having spoke-to-spoke tunnels is a great benefit to delay-sensitive traffic, such as IP telephony and other real-time applications. The delay of the spoke router's progress through the hub to other spokes can be avoided after the latency incurred during the initial set-up. For redundancy, a spoke router can be mapped to one or more DMVPN hubs.

Particular embodiments described herein use Diffie-Hellman key generation as a cryptographic methodology. Such methodologies are well known to those of ordinary skill in the art. These methods can be used to generate an encryption/decryption key from a pair of values, one value being a public value and the other value of the pair being a private value. In the description that follows, these values are denoted as Diffie-Hellman (DH) public values or private values. These values can be generated for each spoke. It will be apparent to those of ordinary skill in the art that other equivalent cryptographic methodologies may also be employed.

Internet Key Exchange (IKE) uses a Diffie-Hellman key exchange to set up a shared session secret, from which cryptographic keys are derived. Public key techniques or, alternatively, a pre-shared key, are used to mutually authenticate the communicating parties.

IPsec provides services and semantics for IPsec Security Associations (SA's) that are shared between two IPsec devices. A Group Controller Key Server (GCKS) is a Group Key Management (GKM) protocol server that manages the IPsec state for a group. A GCKS authenticates and provides the IPsec SA policy and keying material to GKM group members. A GKM Protocol (GKMP), such as the Group Domain of Interpretation (GDOI), is a key management protocol used by a GCKS to distribute IPsec SA policy and keying material. A GKM protocol is used when a group of IPsec devices require the same SA's. For example, when an IPsec SA describes an IP multicast destination, the sender and all receivers can have the group SA. A Group Key Management Subsystem is a subsystem in an IPsec device implementing a GKM protocol. The GKM subsystem provides IPsec SA's to the IPsec subsystem on the IPsec device. A Group Member (GM) as used herein is an IPsec device that belongs to a group. A GM is authorized to be a Group Speaker and/or a Group Receiver.

Using DMVPN, router resources are only claimed when needed. However, this may introduce variable forwarding delays during the time in which resources are being claimed. In these configurations, the spoke typically acts as a NHRP client (NHC) and the hub acts as the NHRP server (NHS). The use of NHRP introduces latency into the routing. Some DMVPN implementations mandate the use of NHRP to resolve the next hop. As part of the next hop resolution, address mappings (e.g., mappings from a first address to a second address) are maintained at the spokes and hubs. In particular, NHRP mapping information maintained at the spokes may include physical and tunnel addresses of the hub and adjacent spokes. NHRP mapping information maintained at the hub may include physical and tunnel addresses of the adjacent spokes. In addition to NHRP adjacency information, each spoke may maintain a routing protocol adjacency with each hub to exchange the routing information to help with any-to-any connectivity.

As described herein in reference to example embodiments, a DMVPN framework that doesn't require the use of NHRP is disclosed. The functionality previously provided by NHRP is incorporated into a key management protocol without introducing any additional latency. Additionally, such frameworks may also imbibe the functionality previously provided by the unicast routing protocol into a key management protocol. In a particular embodiment, one such key management protocol is GDOI. It will be apparent to those of ordinary skill in the art that other conventional key management protocols can similarly be used with the techniques described herein. In this manner, a VPN system can be implemented in which a single control plane is utilized to integrate transport security, peer discovery, and unicast routing.

As described in more detail below, extensions to the key management protocol are provided to enable the encoding of next hop information and prefix reachability information into the key management protocol. In an example embodiment, the GDOI protocol is extended such that, a spoke can pass a first IP address in the GDOI registration message, and the GCKS can store IP address mapping information (e.g., a mapping from the first IP address to a second IP address) and simply reflect the mapping without performing any analysis. In other words, the GCKS can advertise any received routes to other spoke routers without changing the next-hop attribute. If there is a change in mapping or a change in prefix announcement, then the GCKS sends an update to all GMs. The timing of this update (e.g., whether it is performed immediately after the change or at a regular interval) is determined by the local network policy.

The hub/key server (GCKS) only advertises the prefixes that are received within the registration message. In this manner, a VPN system can be implemented in which a single control plane is utilized to integrate transport security, peer discovery and unicast routing.

Figure 1:
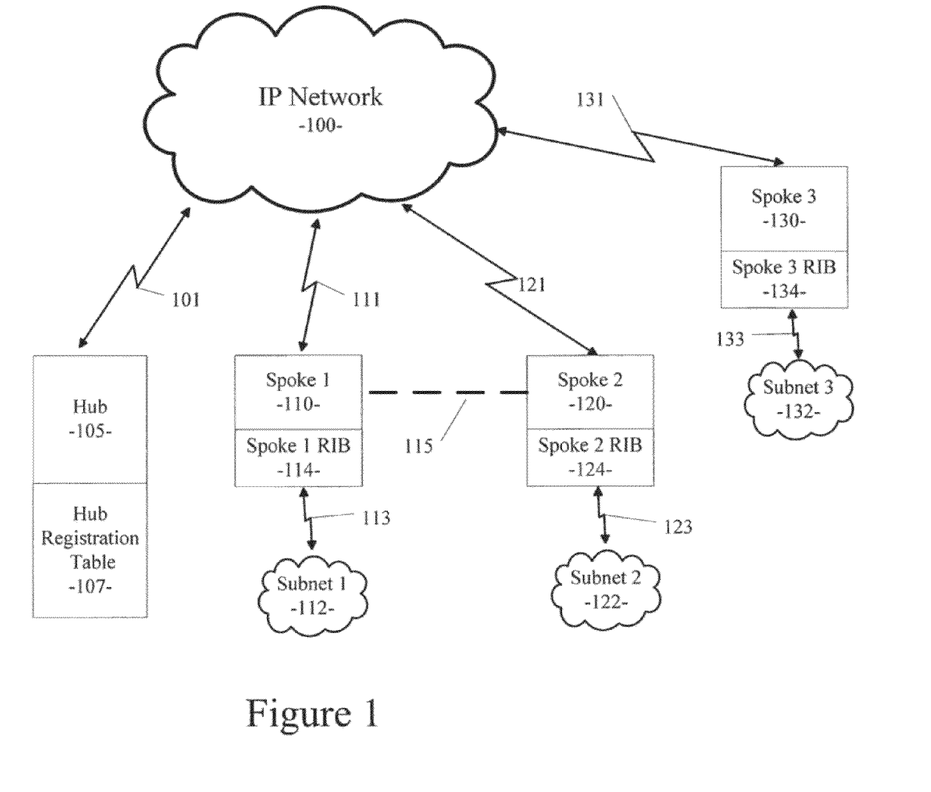
FIG. 1 illustrates the typical network environment of various embodiments.

FIG. 1 illustrates an exemplary network environment. As shown, a hub 105 is logically connected to three spokes 110, 120, and 130 of an Internet Protocol (IP) network 100, such as the Internet. The hub 105 and spokes 110, 120, and 130 can be implemented as network routers, hubs, or gateways. Hub 105 can be an NHRP Server, a GCKS, and/or a hub (generally denoted herein as the hub).

Spokes 110, 120, and 130 can be gateways that each control access to a corresponding subnet 112, 122, and 132, respectively. The subnets, or other nodes connected through the subnets, can represent the destination for a particular data packet. It will be apparent to those of ordinary skill in the art that many other gateways (generally denoted herein as spokes) and subnets will be interconnected in a typical network configuration. Additionally, well-known network routing and data transfer protocols can be used to transfer data between the hub and the spokes and between the spokes themselves via the network 100. In the manner described in more detail below, protected data communication between spokes can be accomplished via the unprotected IP network 100 without incurring the latency common in conventional systems.

In accordance with the various embodiments described herein, each spoke 110, 120, and 130 initially registers itself with hub 105 by sending a spoke registration message to the hub 105 via a hub/spoke interface. When a spoke registers with the hub 105, the spoke can register its IP address, next hop mapping information, and local prefix reachability information. In an example embodiment, the spoke may register with a hub using an enhanced GDOI protocol such that a spoke can pass a first IP address in the GDOI registration message, a spoke can pass next hop mapping information in the GDOI registration message, a spoke can pass local prefix reachability information in the GDOI registration message, and the GCKS can store the first IP address, next hop mapping information, and local prefix reachability information without necessarily performing any analysis or other processing on the information.

Optionally, the spoke may also register a spoke DH public value as part of a set of spoke registration information. For example, when spoke 110 registers with hub 105, spoke 110 may configure a GDOI registration message to include spoke 110's own IP address, spoke 110's next hop mapping information, the identity of subnet 112 (e.g., local prefix reachability information), and optionally the DH public value previously computed for spoke 110.

When spoke 120 registers with hub 105, spoke 120 may generate a GDOI registration message to include spoke 120's own IP address, spoke 120's next hop mapping information, the identity of subnet 122 (e.g., local prefix reachability information), and optionally the DH public value previously computed for spoke 120. The hub 105 may store the spoke registration information received via GDOI in a hub registration table 107 (also denoted NHRP table) or in one or more databases accessible to hub 105. Hub 105 thereby updates the hub registration table 107 or one or more databases. In one embodiment, the hub 105 then sends the updated hub registration table 107, or updated portions thereof, to all registered spokes via GDOI, and the spokes then update their respective copies of the hub registration table 107 or one or more databases accessible to the spoke.

As additional updates are made to the hub registration table 107 and/or databases, a hub updater of the hub 105 can send the entire database or just the portions of the database related to the new/updated information to the registered spokes via GDOI. In this manner, hub 105 updates all the currently-registered spokes with a copy of the current updated hub registration table 107 or only the portions of the updated hub registration table 107 or related databases that have changed (optionally including DH public values for each registered spoke).

Figure 2:
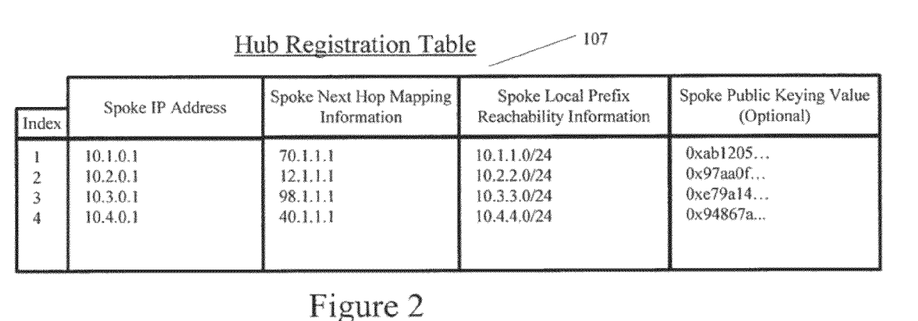
FIG. 2 illustrates an example of the hub registration table of one embodiment.

Referring to FIG. 2, an example embodiment of hub registration table 107 or one or more databases accessible to hub 105 is illustrated. As shown, the example embodiment of hub registration table 107 or related databases includes a record with a set of spoke registration information for each registered spoke. The record for each registered spoke includes the IP address of the spoke, the next hop mapping information (e.g., public address) for the spoke, the local prefix reachability information for the spoke (e.g., subnet addresses), and optionally the DH public value or public key value for the spoke. In a particular embodiment, a separate record specific to each registered spoke, including the spoke registration information detailed above, can be stored in hub registration table 107.

As each spoke registers with hub 105, a record for the newly registered spoke is created in hub registration table 107 and the data items illustrated in FIG. 2, along with other optional items, are updated for the newly registered spoke. Hub 105 thereby updates the hub registration table 107. In one embodiment, the hub 105 then sends the updated hub registration table 107, or only the portions of the updated hub registration table 107 that have changed, to all registered spokes via GDOI, and the spokes then update their respective copies of the hub registration table 107. In this manner, hub 105 updates all the spokes that are currently registered with an updated copy of the current hub registration table 107.

Referring again to FIG. 1, when a spoke needs to forward data traffic to another spoke, the sender spoke first checks to determine if it has a tunnel established with the receiver spoke. Such a tunnel 115 is represented in FIG. 1 as a dashed line from sender spoke 110 to receiver spoke 120. It will be apparent to those of ordinary skill in the art that data transfer between a sender spoke and a receiver spoke through a tunnel may occur via unprotected network 100. If no tunnel was previously established, the sender spoke checks its copy of the hub registration table 107. If the sender spoke 110 finds the receiver spoke 120 address or receiver spoke subnet 122 within the hub registration table 107, the sender spoke 110 can use the information in the hub registration table 107 stored in the sender spoke 110 to open a tunnel 115 to the receiver spoke 120. Next, the sender spoke 110 can send a data packet to the receiver spoke 120 or to subnet 122 via the tunnel 115. When the optional DH public keys are not distributed, shared secret keys distributed by the GCKS can be used.

When the receiver spoke 120 receives a data packet for which the receiver spoke 120 does not have a tunnel 115 established with the sender spoke 110, the receiver spoke 120 can scan its copy of the hub registration table 107 for the source IP address of the sender spoke 110 identified in the received data packet. If the receiver spoke 120 finds the source IP address of the sender spoke 110 in the hub registration table 107, receiver spoke 120 can use the information in the hub registration table 107 stored in the receiver spoke 120 to open a tunnel 115 to the sender spoke 110. Next, the receiver spoke 120 can receive additional data packets from the sender spoke 110 via the tunnel 115.

In a particular embodiment, the sender spoke 110 can use secret keying material distributed by the GCKS to form encryption keys. The receiver spoke 120 then creates a tunnel 115 using the shared secret keys distributed by the GCKS to generate a set of decryption keys. Receiver spoke 120 can use the decryption keys to decrypt the data packet sent from the sender spoke 110 via the tunnel 115. It will be apparent to those of ordinary skill in the art that the generated decryption keys can also be used to check the integrity of the data traffic as well as decrypting the traffic.

In one embodiment, a full hub registration table 107, as shown in FIG. 2, can be maintained on each registered spoke. In addition, as shown in FIG. 2, optional public DH key values (e.g., spoke public keying values) for each registered spoke can also be maintained within the hub registration table 107 on each registered spoke.

In an example embodiment, when a spoke (e.g., spoke 110, 120, or 130) registers with the hub 105, the spoke can register its IP address, next hop mapping information, and local prefix reachability information by encoding this information in a GDOI registration message to the hub 105. Following the registration of a spoke with the hub 105, the hub 105 can forward the new/updated spoke registration information to other registered spokes using GDOI. In one embodiment, the hub 105 sends the updated hub registration table 107, or a portion thereof, to all registered spokes, and the spokes then update their respective local copies of the hub registration table 107. In this manner, hub 105 updates all the spokes that are currently registered with an updated copy of the current hub registration table 107.

In one embodiment, the hub 105 sends the updated hub registration information to other spokes using GDOI. GDOI is a GKM Protocol (GKMP) used by a GCKS to distribute IPsec SA policy and keying material. Note that the hub 105 does not need to analyze the updated hub registration information prior to sending the information to other registered spokes.

Each registered spoke that receives the updated hub registration information in a GDOI message from the hub 105 can store the updated hub registration information in a local spoke data store. In particular, each spoke can store the IP address of the spoke, the next hop mapping information (e.g., public address) for the spoke, the local prefix reachability information for the spoke (e.g., subnet addresses), and optionally the DH public value or public key value for the spoke in a local spoke database. Further, each spoke may install the associated prefix in a spoke routing table (RIB) as shown in FIG. 1. In this manner, spoke prefix information can be stored locally in the spoke (e.g., spoke 1 RIB 114, spoke 2 RIB 124, and spoke 3 RIB 134) and used in next hop resolution. Further, GDOI can be used as a transport mechanism for the updated hub registration information. The hub can use the information from the updated hub registration information in a local hub data store to update the IP routing or forwarding table entries in the hub. Further, a spoke can use the information from the updated hub registration information in a local spoke data store to update the IP routing or forwarding table entries in the spoke.

In one embodiment, when a spoke (e.g., spoke 110, 120, or 130) registers with the hub 105, the spoke does not need to check the availability of the prefix in the routing table (RIB) while including the prefix in the GDOI message sent to the hub 105. In another embodiment, when a spoke (e.g., spoke 110, 120, or 130) registers with the hub 105, the spoke can check the availability of the prefix in the routing table (RIB) prior to including the prefix in the GDOI message sent to the hub 105.

Figure 3:
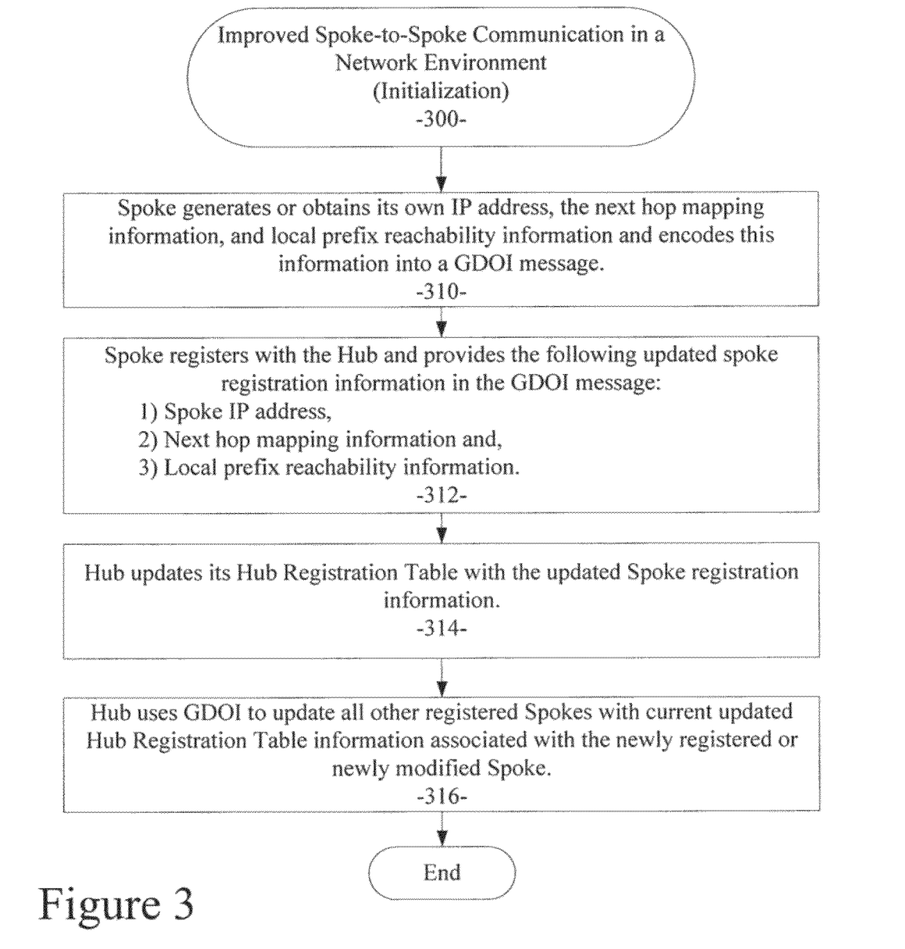
FIG. 3 is a processing flow diagram that illustrates the processing flow in accordance with one example embodiment of the disclosed subject matter.

Referring now to FIG. 3, a flow diagram illustrates the processing logic used in a sample embodiment. FIG. 3 shows a sequence of initialization tasks performed to set up the hub 105, the hub registration table 107, and registering spokes. In processing block 310, a registering spoke generates or obtains its own IP address, next hop mapping information, and local prefix reachability information and it encodes this information into a GDOI message. Next, in processing block 312, the spoke registers with the hub and provides the following updated spoke registration information in a GDOI message to the hub: spoke IP address, next hop mapping information, and local prefix reachability information. In processing block 314, the hub updates its hub Registration Table with the updated spoke registration information. In processing block 316, the hub uses GDOI to update all other registered spokes with current updated hub Registration Table information associated with the newly registered or newly modified spoke.

Figure 4:
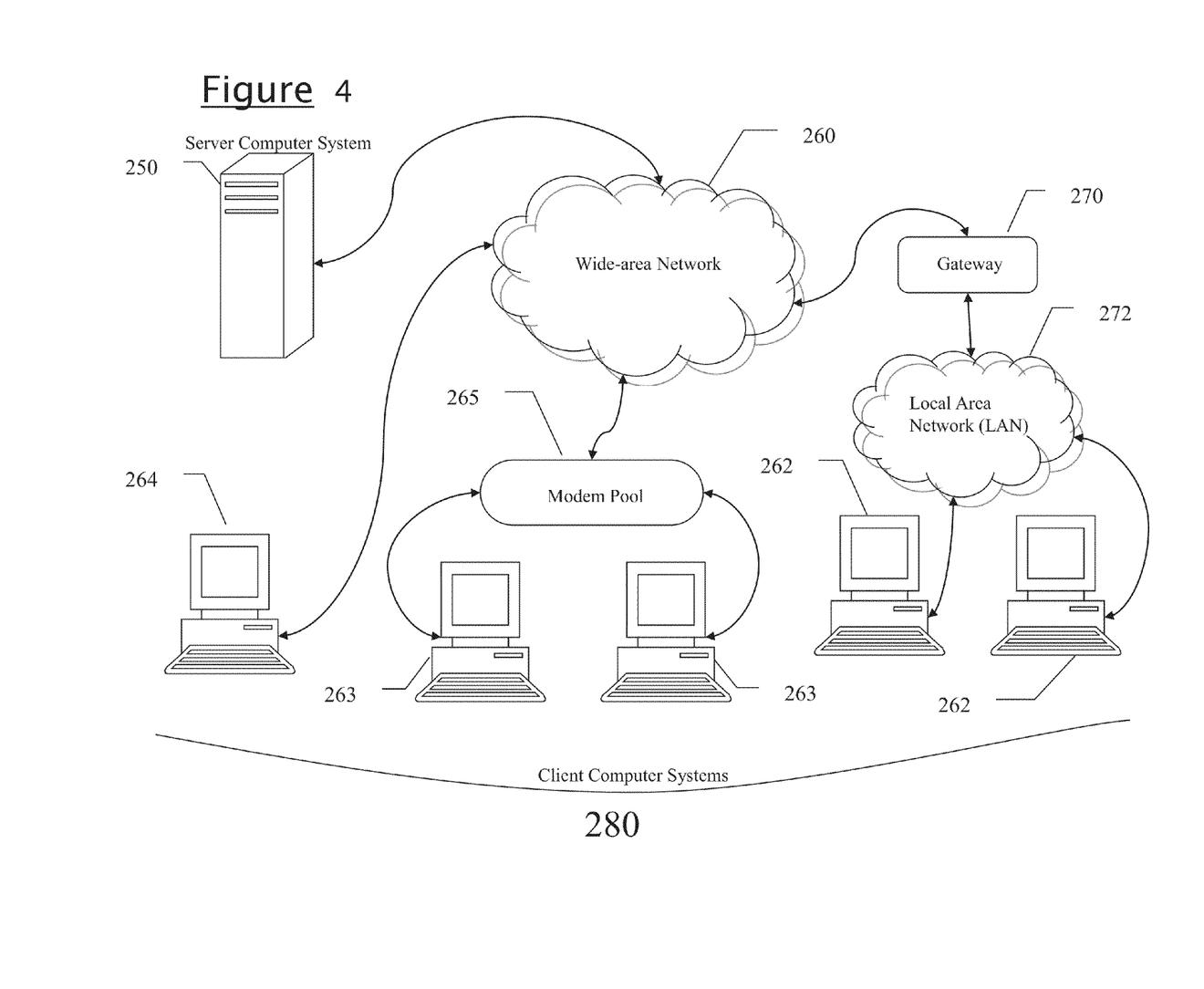
FIG. 4 illustrates a network environment in which an example embodiment may operate.

Referring now to FIG. 4, a diagram illustrates the network environment in which an example embodiment may operate. In this conventional network architecture, a server computer system 250 is coupled to a wide-area network 260. Wide-area network 260 includes the Internet, or other proprietary networks, which are well known to those of ordinary skill in the art. Wide-area network 260 may include conventional network backbones, long-haul telephone lines, Internet service providers, various levels of network routers, and other conventional means for routing data between computers. Using conventional network protocols, server 250 may communicate through wide-area network 260 to a plurality of client computer systems 262, 263, and 264 connected through wide-area network 260 in various ways. For example, client 264 is connected directly to wide-area network 260 through direct or dial-up telephone or other network transmission line. Alternatively, clients 263 may be connected through wide-area network 260 using a modem pool 265. A conventional modem pool 265 allows a plurality of client systems to connect with a smaller set of modems in modem pool 265 for connection through wide-area network 260. In another alternative network topology, wide-area network 260 is connected to a gateway computer 270. Gateway computer 270 is used to route data to clients 262 through a subnet and local area network (LAN) 272. In this manner, clients 262 can communicate with each other through local area network 272 or with server 250 through gateway 270 and wide-area network 260.

Using one of a variety of network connection means, server computer system 250 can communicate with client computers 280 using conventional means. In a particular implementation of this network configuration, a server computer system 250 may operate as a web server if the Internet's World-Wide Web (WWW) is used for wide-area network 260. Using the HTTP protocol and the HTML coding language across wide-area network 260, server computer system 250 may communicate across the World-Wide Web with clients 280. In this configuration, clients 280 use a client application program known as a web browser such as Internet Explorer™ published by Microsoft Corporation of Redmond, Wash., the user interface of America On-Line™, or the web browser or HTML renderer of any other supplier. Using such conventional browsers and the World-Wide Web, clients 280 may access image, graphical, and textual data provided by server computer system 250 or they may run Web application software. Conventional means exist by which clients 280 may supply information to server computer system 250 through the World Wide Web (wide-area network 260) and the server computer system 250 may return processed data to clients 280.

Figure 5:
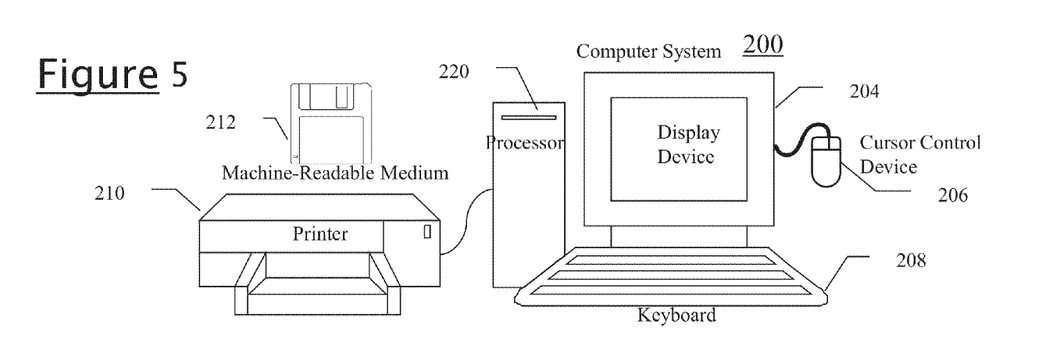
FIGS. 5 and 6 show an exemplary computer system in which the features of an example embodiment may be implemented.
Figure 6:
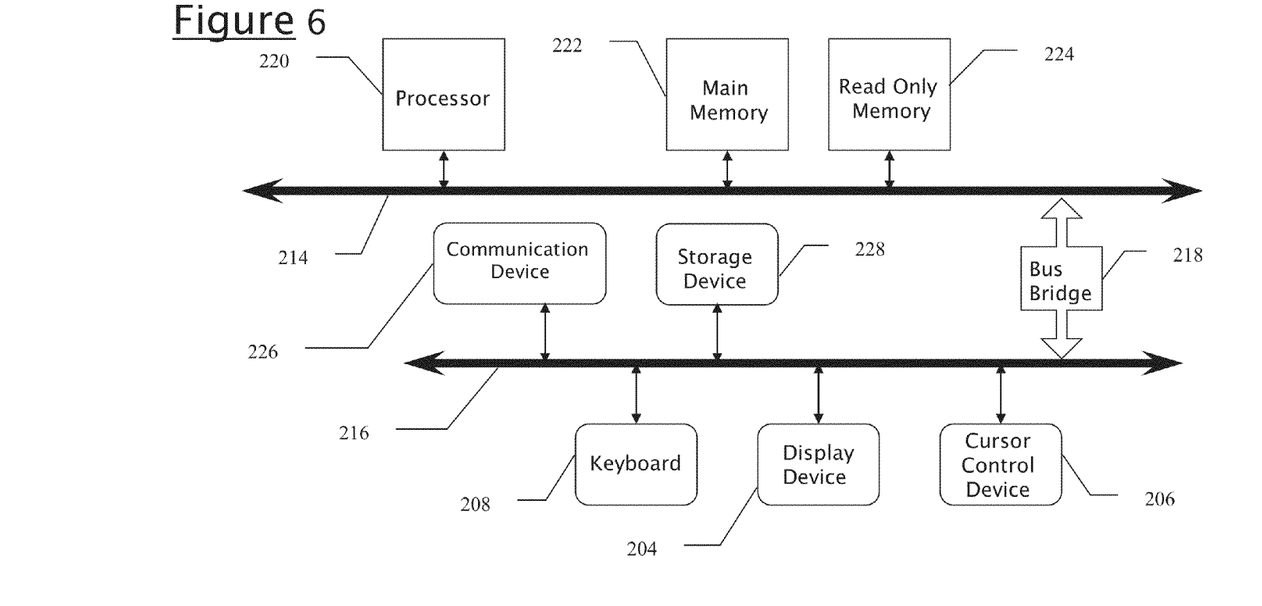

Having briefly described one embodiment of the network environment in which an example embodiment may operate, FIGS. 5 and 6 show an example of a computer system 200 illustrating an exemplary client 280 or server computer system 250, in which the features of an example embodiment may be implemented. Computer system 200 is comprised of a bus or other communications means 214 and 216 for communicating information, and a processing means such as processor 220, coupled with bus 214, for processing information. Computer system 200 further comprises a random access memory (RAM) or other dynamic storage device 222 (commonly referred to as main memory), coupled to bus 214, for storing information and instructions to be executed by processor 220. Main memory 222 may also be used for storing temporary variables or other intermediate information during execution of instructions by processor 220. Computer system 200 also comprises a read only memory (ROM) and/or other static storage device 224, coupled to bus 214, for storing static information and instructions for processor 220. Computer system 200 may also include a machine-readable medium 212, such as a magnetic or optical disk, on which data and processor instructions may to stored and retrieved by processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208 (e.g. a keyboard), including alphanumeric and other keys, is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display device 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as server computer system 250 or other servers, via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of server computer systems 250 via a conventional network infrastructure such as the infrastructure illustrated in FIG. 4 and described above.

The system of an example embodiment includes software, information processing hardware, and various processing steps, which are described above. The features and process steps of example embodiments may be embodied in machine- or computer-executable instructions. The instructions can be used to cause a general purpose or special purpose processor, which is programmed with the instructions, to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

The use of particular embodiments with various types and formats of data structures may be described. It will be apparent to those of ordinary skill in the art that alternative embodiments of the implementations described herein can be employed and still fall within the scope of the claimed embodiments In the detail herein, various embodiments are described as being implemented in computer-implemented processing logic denoted sometimes herein as the "software". As described above, however, the claimed invention is not limited to a purely software implementation.

The software and/embodiments or data described herein may further be transmitted or received over a wide-area network 260 via the communication device 226 utilizing any one of a number of well-known transfer protocols, for example, the hyper-text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store data and one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a system and method for improved efficiency in spoke-to-spoke network communication is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   registering a spoke with a hub;
   updating at least one database with spoke registration information at the hub;
   encoding into the spoke registration information next hop information and prefix reachability information within extensions of a group key management protocol thereby eliminating a need for use of a next hop routing protocol; and
   advertising the spoke registration information to other spokes using a single control plane provided by the extensions of the group key management protocol to integrate transport security, peer discovery, and unicast routing information.

2. The method as claimed in claim 1 including sending information corresponding to at least a portion of the at least one database to a plurality of registered spokes via a Group Key Management Protocol (GKMP).

3. The method as claimed in claim 2 wherein the GKMP includes a set of GKMP extensions.

4. The method as claimed in claim 3 wherein the set of GKMP extensions carry information pertaining to the single control plane.

5. The method as claimed in claim 3 wherein the set of GKMP extensions carry information pertaining to the single control plane, the information including next-hop mapping information.

6. The method as claimed in claim 3 wherein the set of GKMP extensions carry information pertaining to the single control plane, the information including prefix reachability information.

7. A method comprising:
   registering a spoke with a hub via a Group Key Management Protocol (GKMP);
   updating at least one database with spoke registration information;
   encoding into the spoke registration information next hop information and prefix reachability information within extensions of the Group Key Management Protocol (GKMP) thereby eliminating a need for use of a next hop routing protocol; and sending information corresponding to at least a portion of the at least one database to a plurality of registered spokes via a single control plane provided by the extensions of the Group Key Management Protocol (GKMP).

8. The method as claimed in claim 7 wherein the GKMP includes a set of GKMP extensions.

9. The method as claimed in claim 7 wherein registering a spoke with a hub includes providing, in a GKMP message for the hub, spoke registration information including an IP address, and next hop mapping information corresponding to the registering spoke.

10. The method as claimed in claim 7 wherein registering a spoke with a hub includes providing, in a GKMP message for the hub, spoke registration information including an IP address, next hop mapping information, and local prefix reachability information corresponding to the registering spoke.

11. The method as claimed in claim 9 wherein the next hop mapping information corresponds to an association of one or more next-hop IP addresses with one or more IP addresses.

12. The method as claimed in claim 7 including obtaining next hop mapping information and local prefix reachability information from the at least one database.

13. The method as claimed in claim 7 including obtaining next hop mapping information and local prefix reachability information in either an aggregated manner or an individual manner.

14. The method as claimed in claim 7 wherein the hub maintains the at least one database.

15. The method as claimed in claim 7 wherein the spoke maintains a local spoke database which includes information corresponding to at least a portion of the at least one database.

16. The method as claimed in claim 15 wherein the spoke uses the information from the local spoke database to update IP routing or forwarding table entries in the spoke.

17. The method as claimed in claim 7 wherein the hub uses the information from the at least one database to update IP routing or forwarding table entries in the hub.

18. A method comprising:
registering a spoke with a hub using extensions of a Group Key Management Protocol (GKMP) message to provide spoke registration information including an IP address, next hop mapping information, and local prefix reachability information corresponding to the registering spoke thereby eliminating a need for use of a next hop routing protocol;
updating at least one database with the spoke registration information; and
sending information corresponding to at least a portion of the at least one database to a plurality of registered spokes via a single control plane provided by the extensions of the Group Key Management Protocol (GKMP) message, the information having encoded therein next hop information and prefix reachability information within the extensions of the Group Key Management Protocol (GKMP) thereby eliminating a need for use of the next hop routing protocol.

19. The method as claimed in claim 18 wherein the hub maintains the at least one database.

20. The method as claimed in claim 18 wherein the spoke maintains a local spoke data store which includes information corresponding to at least a portion of the at least one database.

21. An apparatus comprising:
means for registering a spoke with a hub via a Group Key Management Protocol (GKMP);
means for updating at least one database with spoke registration information;
encoding into the spoke registration information next hop information and prefix reachability information within extensions of the Group Key Management Protocol (GKMP) thereby eliminating a need for use of a next hop routing protocol; and
means for sending information corresponding to at least a portion of the at least one database to a plurality of registered spokes via a single control plane provided by the extensions of the Group Key Management Protocol (GKMP).

22. The apparatus as claimed in claim 21 wherein the GKMP includes a set of GKMP extensions.

23. A hub apparatus comprising:
a hub/spoke interface to receive a spoke registration message from a spoke via a Group Key Management Protocol (GKMP);
a hub database for storage of spoke registration information from the spoke registration message; and
a hub updater to encode into the spoke registration information next hop information and prefix reachability information within extensions of the Group Key Management Protocol (GKMP) thereby eliminating a need for use of a next hop routing protocol, the hub updater further to send information corresponding to at least a portion of the hub database to a plurality of registered spokes via a single control plane provided by the extensions of the Group Key Management Protocol (GKMP).

24. The hub apparatus as claimed in claim 23 wherein the spoke registration message includes an IP address, next hop mapping information, and local prefix reachability information corresponding to the registering spoke.

* * * * *